United States Patent
Moore et al.

(10) Patent No.: US 8,602,443 B2
(45) Date of Patent: Dec. 10, 2013

(54) ADJUSTABLE MULTI-PURPOSE DOLLY

(75) Inventors: Todd E. A. Moore, Ottawa (CA);
Arthur Bounardjan, Burnaby (CA);
Miles Hammond, Ottawa (CA); Kevin Bailey, Ottawa (CA)

(73) Assignee: Todd E. A. Moore, Ottawa (CA)

( * ) Notice: Subject to any disclaimer, the term of this patent is extended or adjusted under 35 U.S.C. 154(b) by 117 days.

(21) Appl. No.: 13/009,204

(22) Filed: Jan. 19, 2011

(65) Prior Publication Data
US 2012/0018966 A1    Jan. 26, 2012

Related U.S. Application Data

(60) Provisional application No. 61/296,271, filed on Jan. 19, 2010.

(51) Int. Cl.
*B62B 3/02*      (2006.01)

(52) U.S. Cl.
USPC .......................................... 280/651; 280/79.3

(58) Field of Classification Search
USPC ............. 280/79.11, 79.3, 638, 639, 651, 652, 280/655, 659
See application file for complete search history.

(56) References Cited

U.S. PATENT DOCUMENTS

| | | | | |
|---|---|---|---|---|
| 3,762,739 A * | 10/1973 | Tabet | ................ | 280/47.371 |
| 3,861,695 A * | 1/1975 | Shourek et al. | ........... | 280/5.24 |
| 4,128,252 A * | 12/1978 | Raniero | ............ | 280/40 |
| 4,512,591 A * | 4/1985 | Plante | ............ | 280/47.35 |
| 4,523,768 A * | 6/1985 | Dlubala | ............ | 280/42 |
| 4,822,066 A | 4/1989 | Rehrig | | |
| 5,536,034 A | 7/1996 | Miller | | |
| 5,653,457 A * | 8/1997 | Marmer et al. | ........ | 280/30 |
| 5,738,365 A * | 4/1998 | McCarthy | .......... | 280/651 |
| 6,079,941 A | 6/2000 | Lee | | |
| 6,196,568 B1 * | 3/2001 | Stevens | .......... | 280/304.1 |
| 6,328,319 B1 | 12/2001 | Stahler | | |
| 6,866,463 B2 | 3/2005 | Riordan | | |
| 7,134,673 B2 | 11/2006 | Ferraro | | |
| 7,513,511 B2 | 4/2009 | Chaseateau | | |
| 7,588,257 B2 * | 9/2009 | Gu | ............ | 280/79.11 |
| 7,854,444 B2 | 12/2010 | Zhuang | | |

* cited by examiner

*Primary Examiner* — Frank Vanaman

(57) ABSTRACT

A dolly for moving objects having a rectangular platform with casters mounted underneath, having four posts which may be raised from the base and locked into an upright position. The posts further have crossbars pivotally mounted thereon, which are releasably connectable to the crossbars of adjacent posts, to form a supportive railing around the tops of the posts. The posts may further be connected by means of telescopic arms, which are pivotally connected to one crossbar, and extendible to another crossbar, wherein they may be releasably connected by means of a knob at the end of the telescopic arm being pressed into an inverted teardrop-shaped receptacle.

8 Claims, 15 Drawing Sheets

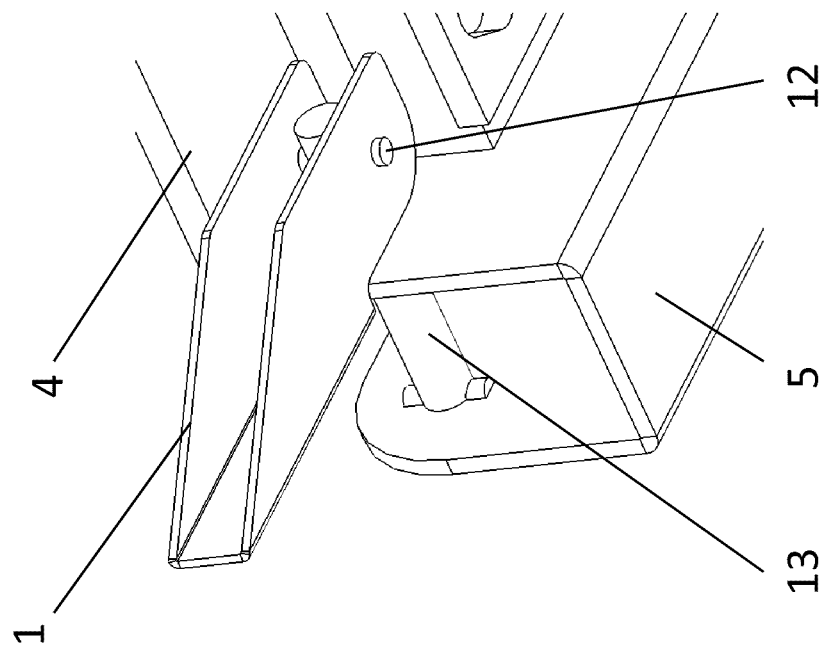
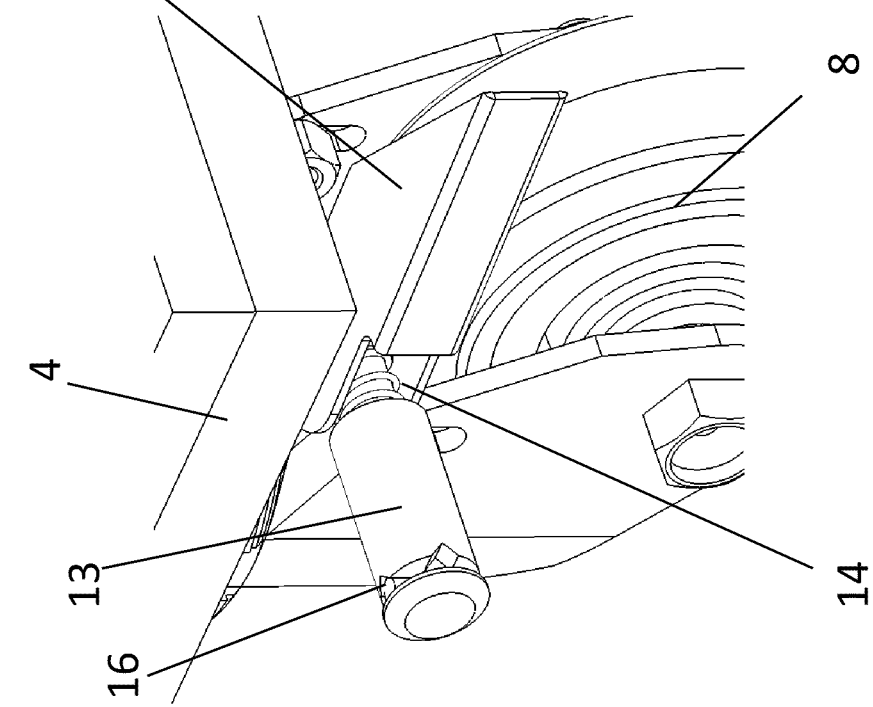

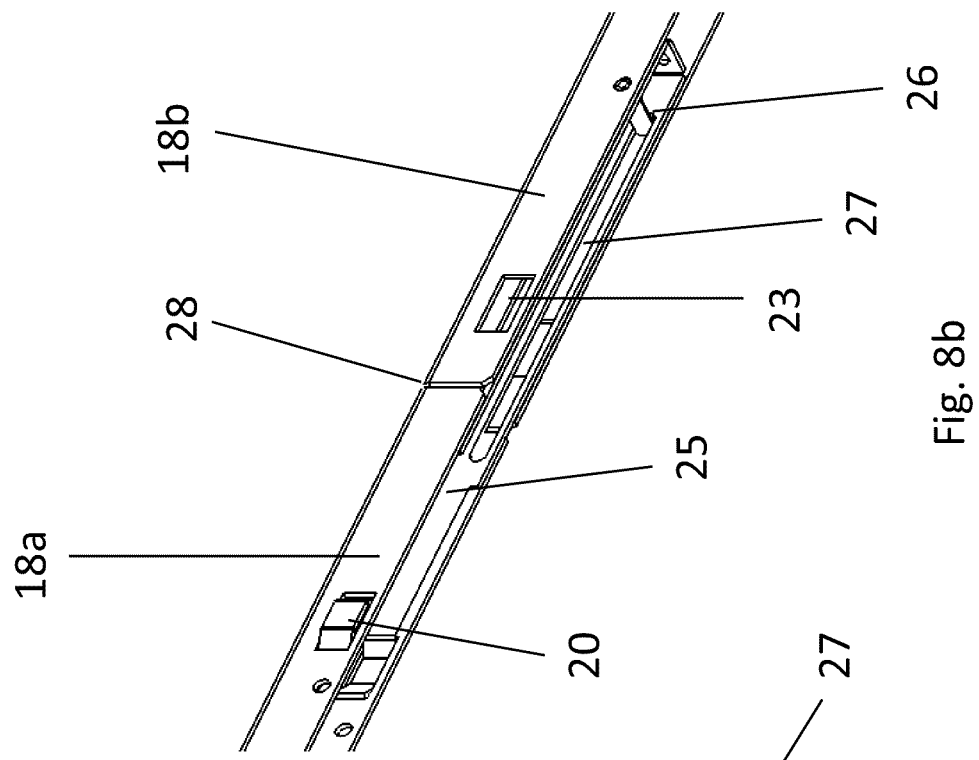
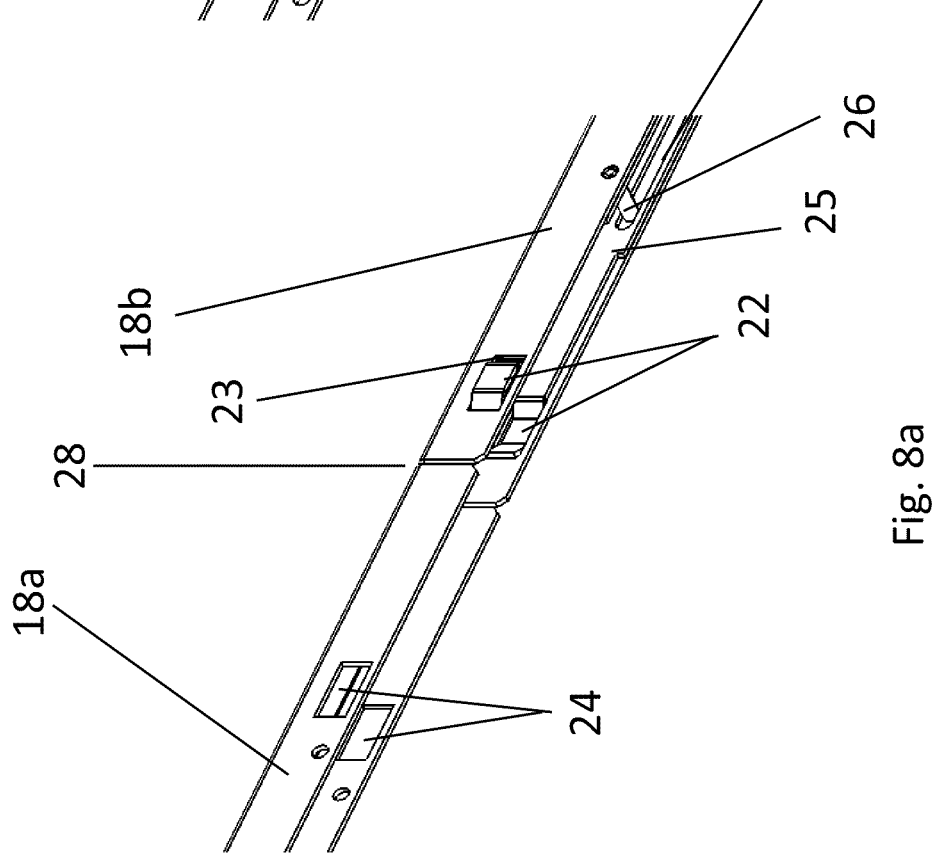

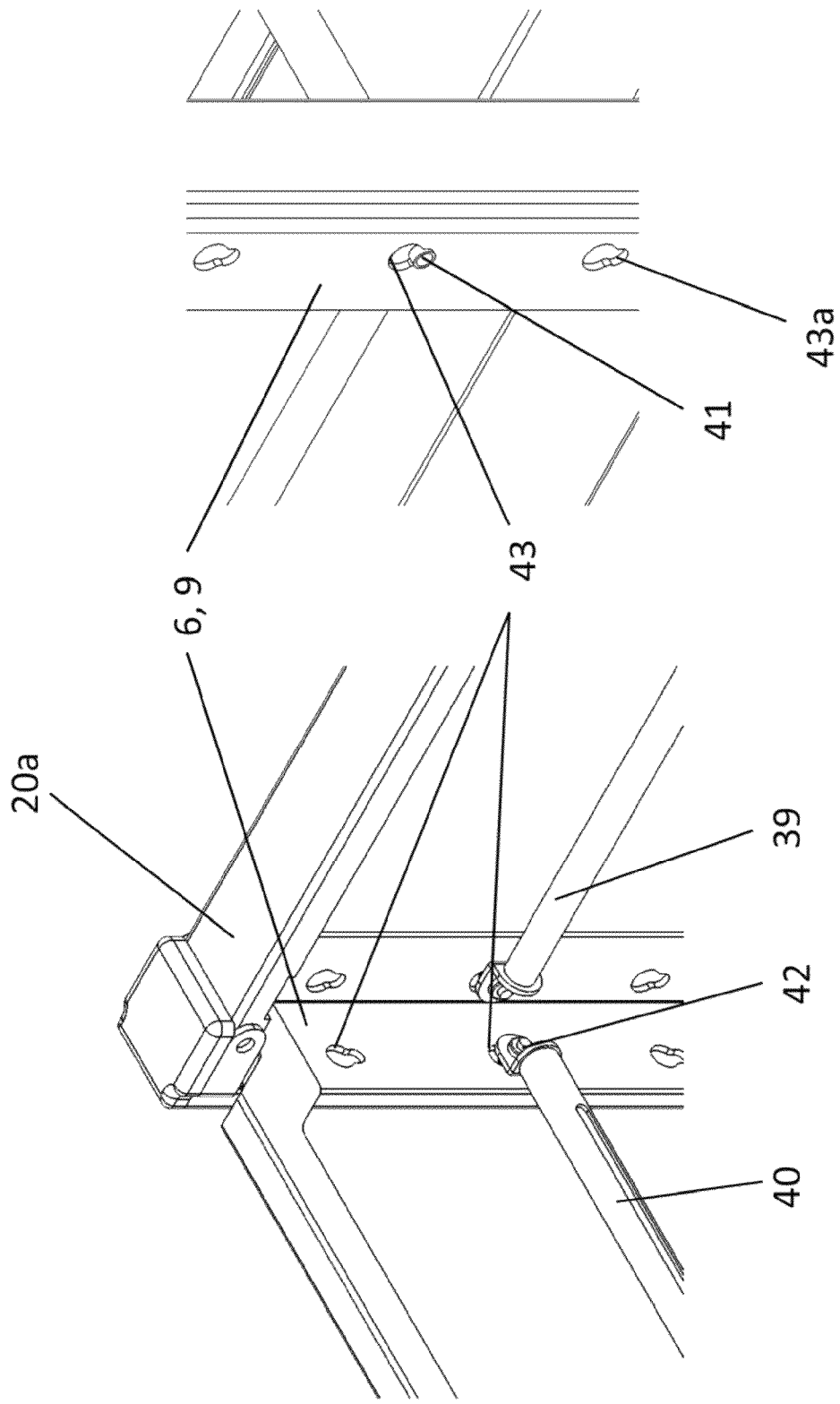

ADJUSTABLE MULTI-PURPOSE DOLLY

CROSS-REFERENCE TO RELATED APPLICATIONS

This application claims the benefit of U.S. provisional patent application Ser. No. 61/296,271, filed on Jan. 19, 2010, all of which is incorporated by reference as if completely written herein.

TECHNICAL FIELD

This disclosure relates to adjustable multi-purpose dolly and, in particular, dollies that are adjustable to have sides.

BACKGROUND

Moving personnel are known to use one type of material handling dolly, which consists of generally a platform mounted on four or more swivel-mounted casters. An example of this is U.S. Pat. No. 4,822,066. Other dollies with railings for holding masses of smaller objects have also been used in the moving industry, an example being U.S. Pat. No. 6,866,463. In U.S. Pat. No. 7,854,444 a cart convertible to a Bellman cart is disclosed. A moving cart is disclosed in U.S. Pat. No. 7,134,673 which has a series of interlocking, stackable storage modules.

Further prior art is exemplified in U.S. Pat. No. 6,328,319 a hand truck that may be converted into a cart is disclosed, having a plate attached to the frame moveable between a first and second position, the second position forming a tabletop surface. In U.S. Pat. No. 7,513,511 a device that can be used as a 2-wheel dolly, a 4-wheel dolly, a flat-bed truck and a standard display table is disclosed. A moving system is disclosed in U.S. Pat. No. 6,079,941, made up of separable platform sections, with an extendible handle and ramps to facilitate the moving of objects. A convertible bulk hand truck and table top is disclosed in U.S. Pat. No. 5,536,034, which is convertible between a hand truck, a 2-wheeled dolly and a 4-wheeled dolly.

The aforementioned prior art fails to effectively meet the needs of movers for an adaptable dolly that may be adjusted to suit particular needs. Different moving tasks may require different means to move materials, which results in the personnel having to travel back and forth with the same dolly or find alternative means of lugging the material. More specifically, having multiple dollies increases the time needed to find the correct tool for the Job, it also increases the storage space needed for the multiple types of different dollies required for the one Job. Therefore there is a need for one dolly which may be modified so that it is able to carry a variety of object types.

SUMMARY

An adjustable transport dolly for storing or carrying objects between one or more locations is disclosed, said adjustable dolly comprising a rectangular platform having a narrow dimension and a wide dimension, and having one or more casters mounted to its underside; post storage mounted to opposite sides having a wide dimension of said platform; two first posts and two second posts each pivotally mounted to said post storage at a corner of said platform, which posts are moveable between open and closed positions, each post having two crossbars pivotally mounted thereto, the crossbars for connection with the adjacent post across the narrow dimension and the adjacent post across the wide dimension, to add rigidity and keep objects on the platform.

The dolly described above is further disclosed, wherein said first and second posts have a locking mechanism controlling pivoting of said posts, the locking mechanism comprising a slider hinge mounted to the underside of said platform; a locking slider pivotally mounted to said hinge, which slider is in contact with said post storage; a locking pin connected to said locking slider, wherein the locking pin is locked and released by movement of the locking slider, which slider exerts force against said post storage when moved into a locked position by camming against the post storage.

The dolly described above is further disclosed, each post further comprising telescopic arms for connection to adjacent posts, the telescopic arms comprising an external segment pivotally connected to a first crossbar; an internal segment slidably extendable from said external segment, the internal segment having an outer tip at its extremity, and a knob mounted to said outer tip; the second crossbar having an inverted teardrop-shaped receptacle for releasably restraining said knob.

The dolly described above is further disclosed wherein each post has two telescopic arms for connection to adjacent posts.

The dolly described above is further disclosed, wherein the crossbars are formed of crossbar sections having a length of approximately half of the distance between adjacent posts.

The dolly described above is further disclosed, wherein a first crossbar is releasably connected with a second crossbar of an adjacent post by a connection means comprising a brace slidably mounted within a crossbar section; a switch operably connected to said brace wherein said crossbars sections each have an opening, and said switch may be moved from said opening of the first crossbar section to said opening of the second crossbar section, so as to slide the brace between said crossbar sections.

The dolly described above is further disclosed, wherein a first crossbar section is releasably connected with a second crossbar section of an adjacent post by a connection means comprising a brace slidably mounted within a first crossbar section, the brace having grooves at a tip protruding from an end of the crossbar section; a spring operatively connected between said brace and said first crossbar section, to bias the tip towards the end of said crossbar section; the second crossbar section having a locking rod mounted therein for interfacing with said grooves, wherein said grooves are releasable by sliding said brace away from the end of the crossbar section.

The dolly described above is disclosed wherein the platform is square and the narrow dimension equals the wide dimension.

A method of efficiently and securely storing or carrying objects between one or more locations is disclosed, the method comprising: positioning the object onto an adjustable platform of a dolly, extending one or more posts, crossbars or telescopic arms or a combination thereof from the platform transforming the dolly into the required formation for carrying or storing the objects, and moving wheels of the dolly platform in the required direction.

BRIEF DESCRIPTION OF THE DRAWINGS

The invention both as to its organization and method of operation, together with further aspects and advantages thereof, may be best understood by reference to the accompanying drawings and text thereof in light of the brief description therefore.

FIG. 6a is a detailed view of the locking slider and pin from above, with the post storage removed, in accordance with the present invention;

FIG. 6b is a detailed view of the locking slider and pin from below, with the post storage in place, in accordance with the present invention;

FIG. 8a is a detailed view of the narrow crossbars in an unlocked position, in accordance with the present invention;

FIG. 8b is a detailed view of the narrow crossbars in a connected and locked position, in accordance with the present invention;

FIG. 10a is a detailed view of the post with the telescopic arms connected thereto, in accordance with the present invention;

FIG. 10b is a detailed view of the outside of the post, in accordance with the present invention;

DETAILED DESCRIPTION OF THE PREFERRED EMBODIMENTS

The present invention will now be described more fully hereinafter with reference to the accompanying drawings, in which preferred embodiments of the present invention are shown. This invention may however, be embodied in many different forms and should not be construed as limited to the embodiments set forth herein. Rather, these embodiments are provided so that this application will be thorough in illustrations and brief explanation therefore to convey the true scope of the invention to those skilled in the art. Some illustrations provided herein include detailed explanations of dimension and operation and as such should be not be limited thereto.

Figure 1:
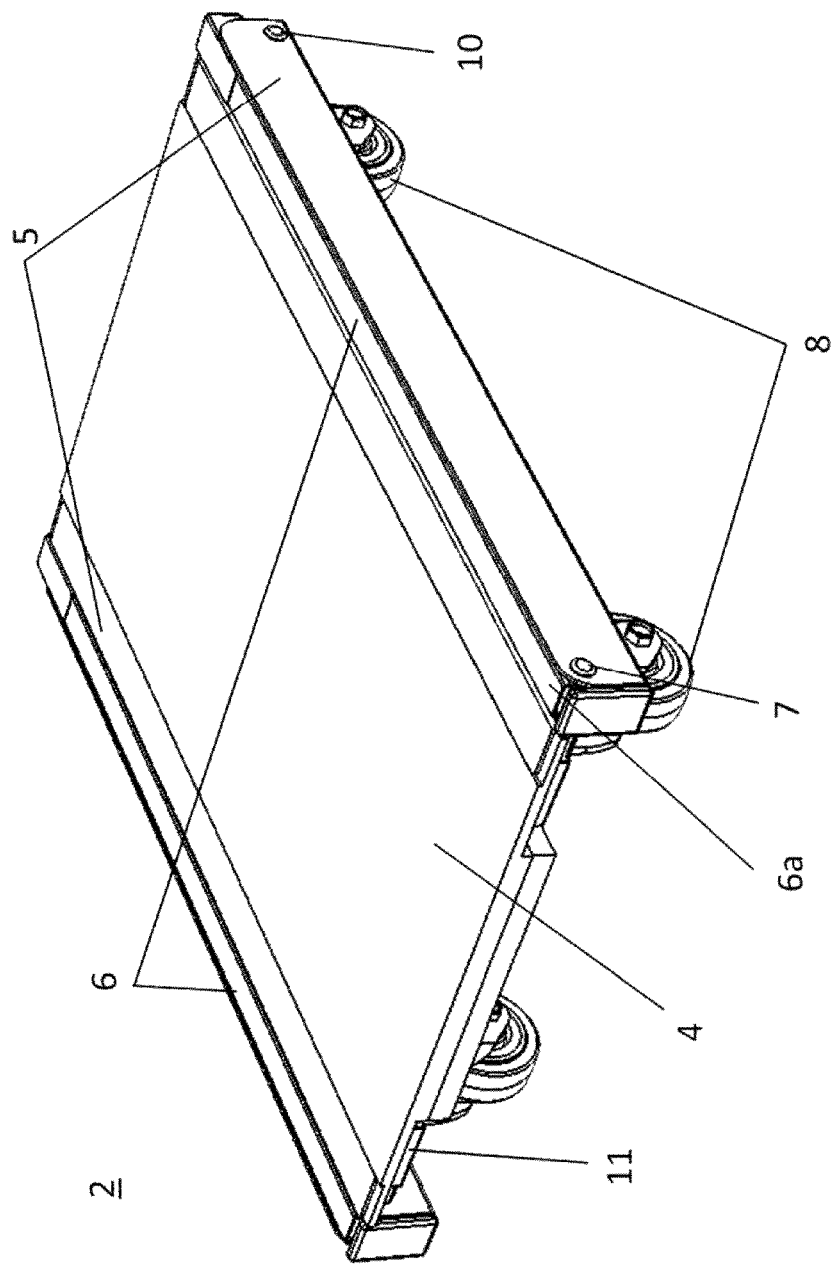
FIG. 1 is a perspective view of the dolly in a closed position, in accordance with the present invention.
Figure 2:
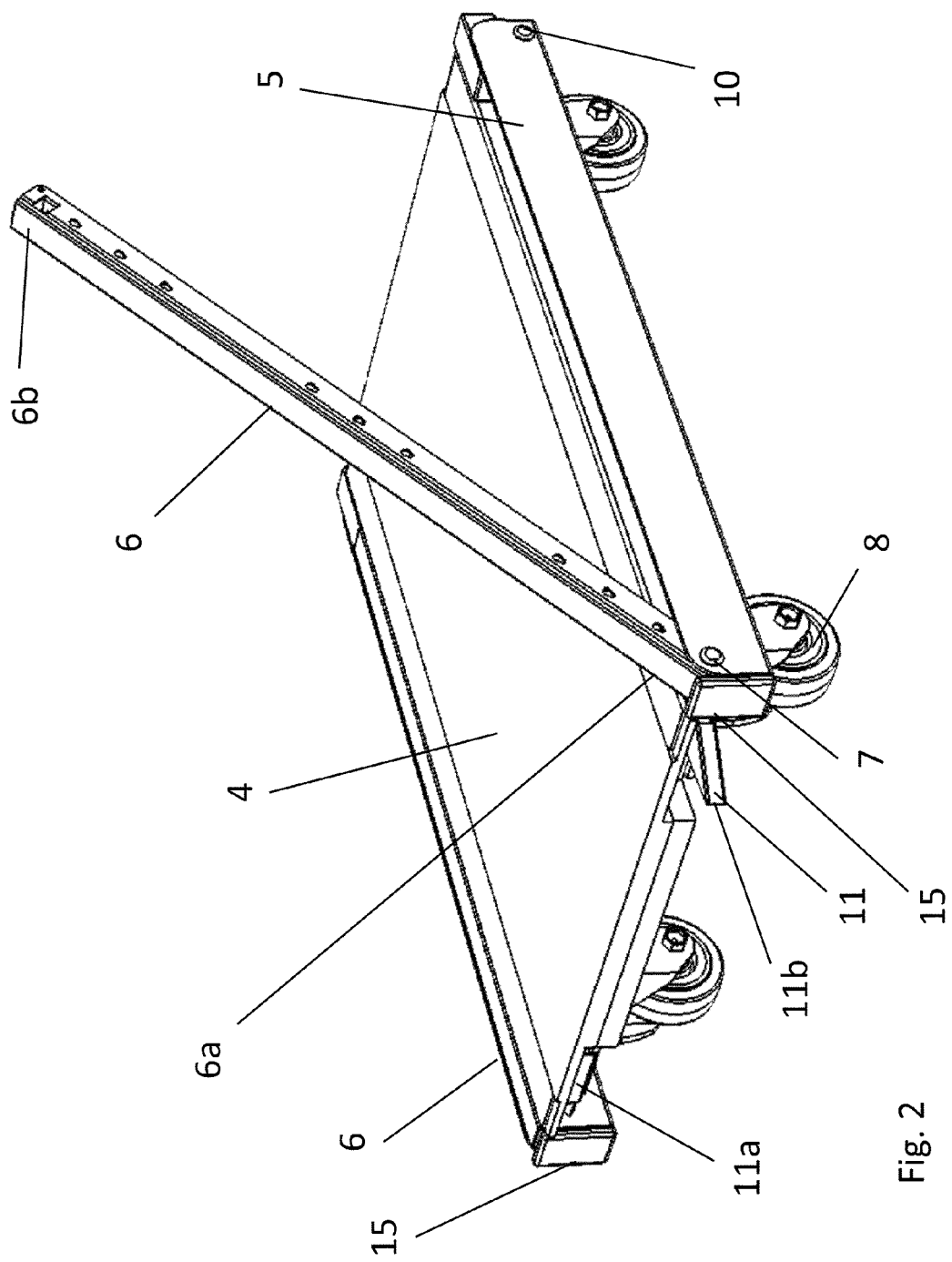
FIG. 2 is a perspective view of the dolly with a post in a partially-raised position, in accordance with the present invention.
Figure 3:
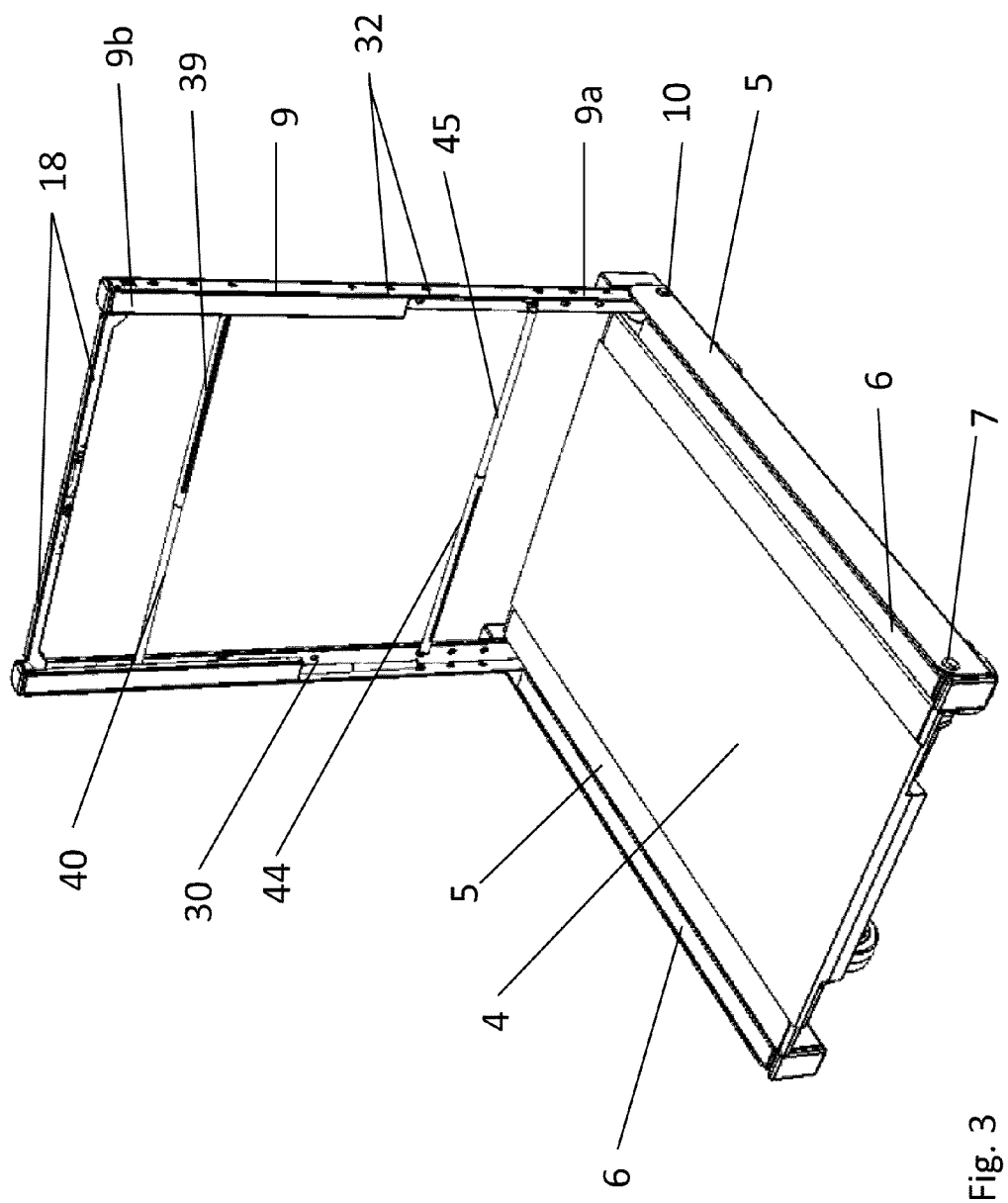
FIG. 3 is a perspective view of the dolly with two posts raised and connected by crossbars, in accordance with the present invention.
Figure 4:
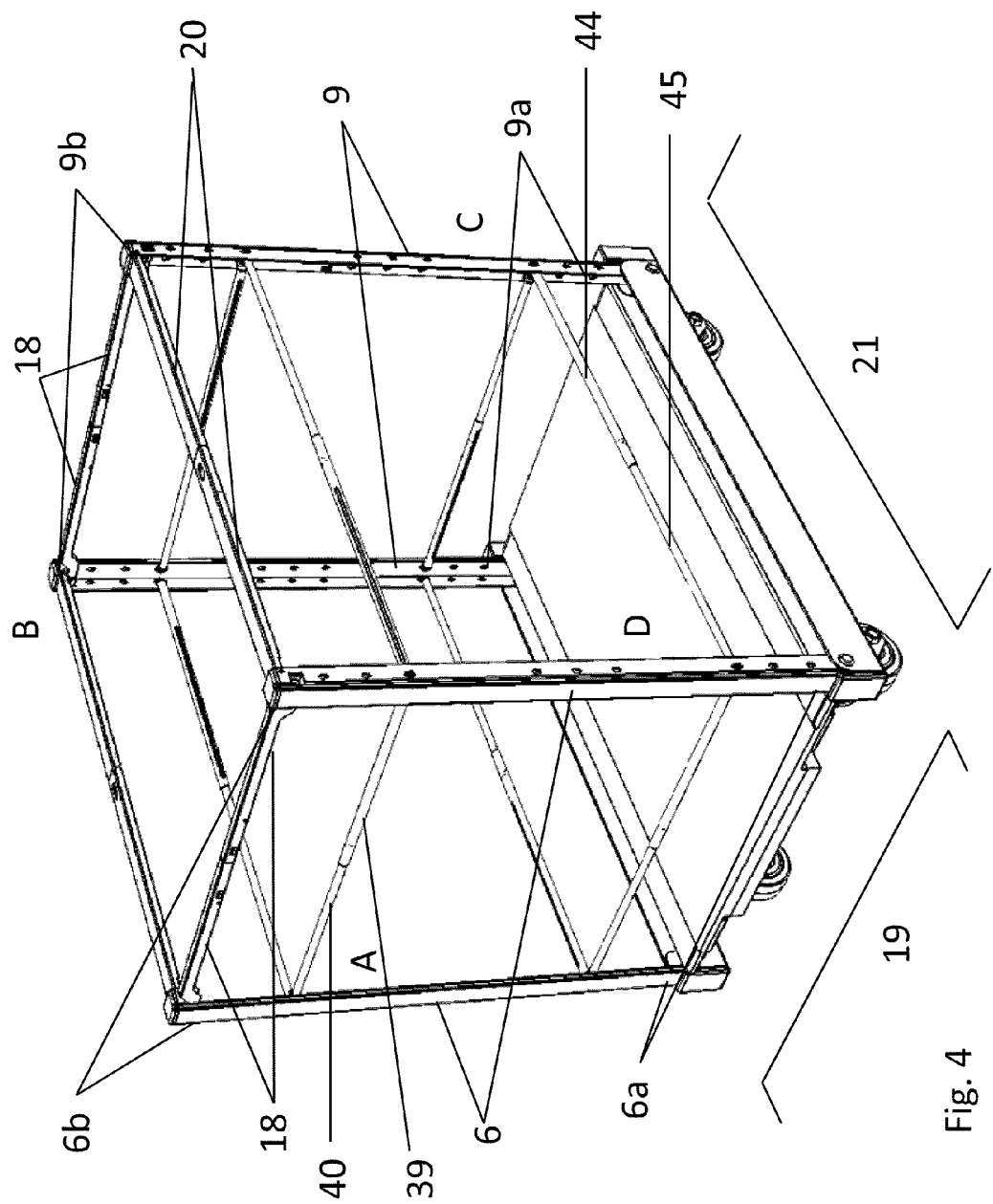
FIG. 4 is a perspective view of the dolly with all four posts raised and connected by crossbars, in accordance with the present invention.
Figure 5:
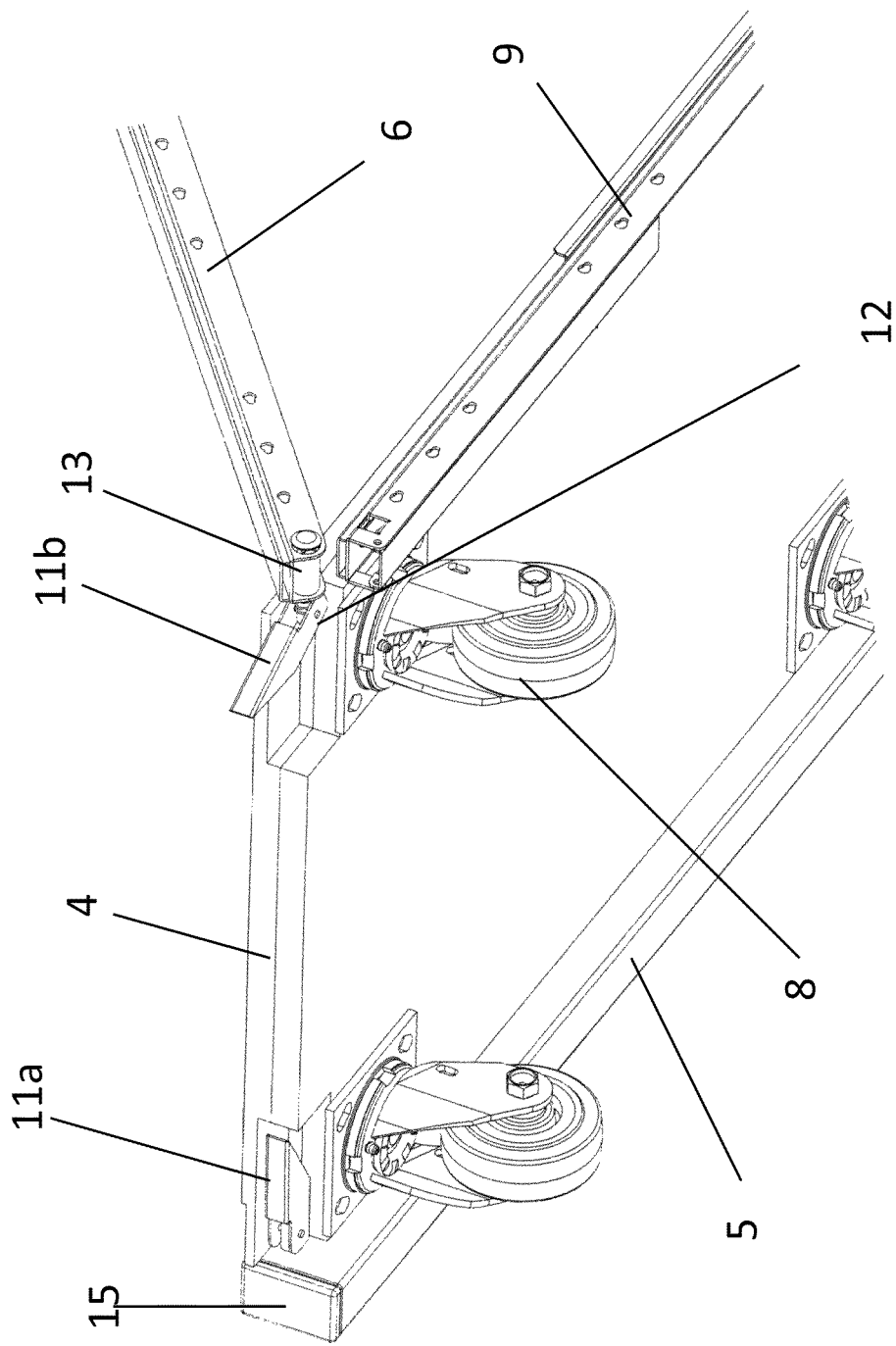
FIG. 5 is a detailed view of front of the dolly, in accordance with the present invention.

Referring in general to the figures and in particular to FIGS. 1-4 a base model of a rectangular shaped dolly 2 (the term "dolly" can also be applied interchangeably with a vehicle or cart having at least one wheel attached thereto) having a platform 4 with integral adjustable first posts 6 positioned at either side of the dolly 2, flush with the platform 4 in the closed position shown in FIG. 1. Having a rectangular shape, the platform 4 has a narrow dimension 19 and a wide dimension 21, highlighted in FIG. 4. Where the platform is square, the narrow and wide dimension 19, 21 are of equivalent dimensions. The wide dimension 21 has a post storage 5 attached to it on either side of the dolly 2, for storing the posts when in a closed position. In one embodiment, the platform 4 has a post storage 5 on each side of preferably the wider dimension 21, which post storage 5 is fastened on to the platform 4 by bolts or other fastening means. In another embodiment the post storage 5 is integral to the platform 4. The first posts 6 are hinged at one end by a pin 7, so that they may be raised from the first platform 4. A post 6 is shown in a partially-raised position in FIG. 2, and in a fully-raised position in FIG. 3. The first posts 6 when raised pivot on the pin 7 which forms a hinge as it is mounted through the post storage 5 and through the base end 6a of the first post 6. Second posts 9 are positioned below the first posts 6 in post storage 5, and are hinged at the base end 9a with second pins 10. First and second posts 6, 9 are each mounted at approximately a corner of the platform 4, and in a closed position the second posts 9 lies in a horizontal orientation below the first posts 6 within the post storage 5. FIG. 4 shows second posts extended from the post storage 5, having pivoted on second pins 10 are mounted through post storage 5 as well as through one end of second posts (not shown), so that second posts 9 may pivot in a similar manner as first posts 6. The underside of the platform 4 has one or more casters 8, more preferably two pairs of wheels 8 for moving the dolly in a multi-directional path as and when required by the end-user. The casters 8 may be fixed and roll in one dimension, or may be swiveling casters which are able to roll in two dimensions, or a combination of the two. One skilled in the art would appreciate that other wheel combinations may be used for rendering the dolly moveable, without departing from the scope of the invention.

With reference to FIGS. 2, 5, 6a and 6b, a locking mechanism is used to keep the posts in one of three positions: 1) the closed position, wherein the posts 6, 9 are folded down, that is horizontal, and within the post storage 5; 2) the raised position, wherein the posts 6, 9 are fully raised; or a 3) combination of the two wherein some posts 6, 9 are raised and others are closed. A locking mechanism is present at the base 6a, 9a of each post, and includes a locking slider 11 which pivots around a slider hinge 12 bolted to the underside of the platform 4. The locking slider has a locking pin 13 connected thereto, which pin 13 may be pulled in and pushed out by movement of the slider 11. The locking slider 11 has a shape that enables camming against the post storage 5 against which it is mounted, so that when the slider 11 pivots between a locked position and a released position, the locking pin 13 is pushed out from the platform 4. When the locking slider 11 is pivoted from a released position to a locked position, the camming shape results in the locking pin 13 being pulled in towards the platform 4. As a result of this, when the post 6, 9 is in a closed position, the locking slider 11 may be pushed into a closed position 11a, rotating on its hinge 12, and by means of its camming action against the post storage, retracting said pin 13, which exerts pressure on the base 6a, 9a of the post, and retains the post 6, 9, preventing it from pivoting and effectively locking the post 6, 9 in its closed position 11a while the locking slider is also in a closed position. To raise the post 6, 9, the locking slider 11 is moved into an open position 11b, that is, pivoted on the hinge 12 so that it now protrudes from the side of the platform 4. The camming action of the slider 11 now releases the pressure of the locking pin 13. This enables the post corresponding to that locking slider 11 to be raised by lifting it, as it is no longer locked into place. The movement of the locking slider 11 is facilitated by means of a spring 14. The post 6, 9, once in a raised position, is prevented from being raised beyond 90° by the stop 15, which is formed by bending an extension of the metal from which the post storage 5 is formed. Once the post is in a raised position, the post can be locked by sliding the locking slider 11 around the hinge 12 so that the locking pin 13 once again tightens on the base 6a, 9a of the post, preventing the post from being lowered while the locking pin 13 exerts pressure. To facilitate the locking pin 13 gripping the post 6,9, in one embodiment the locking pin 13 has teeth 16 which engage in corresponding recesses (not shown) on the post 6, 9. One skilled in the art would appreciate that there are many ways to lock the posts into position, any of which may result in the post being locked while not departing from the scope of the invention.

Figure 7:
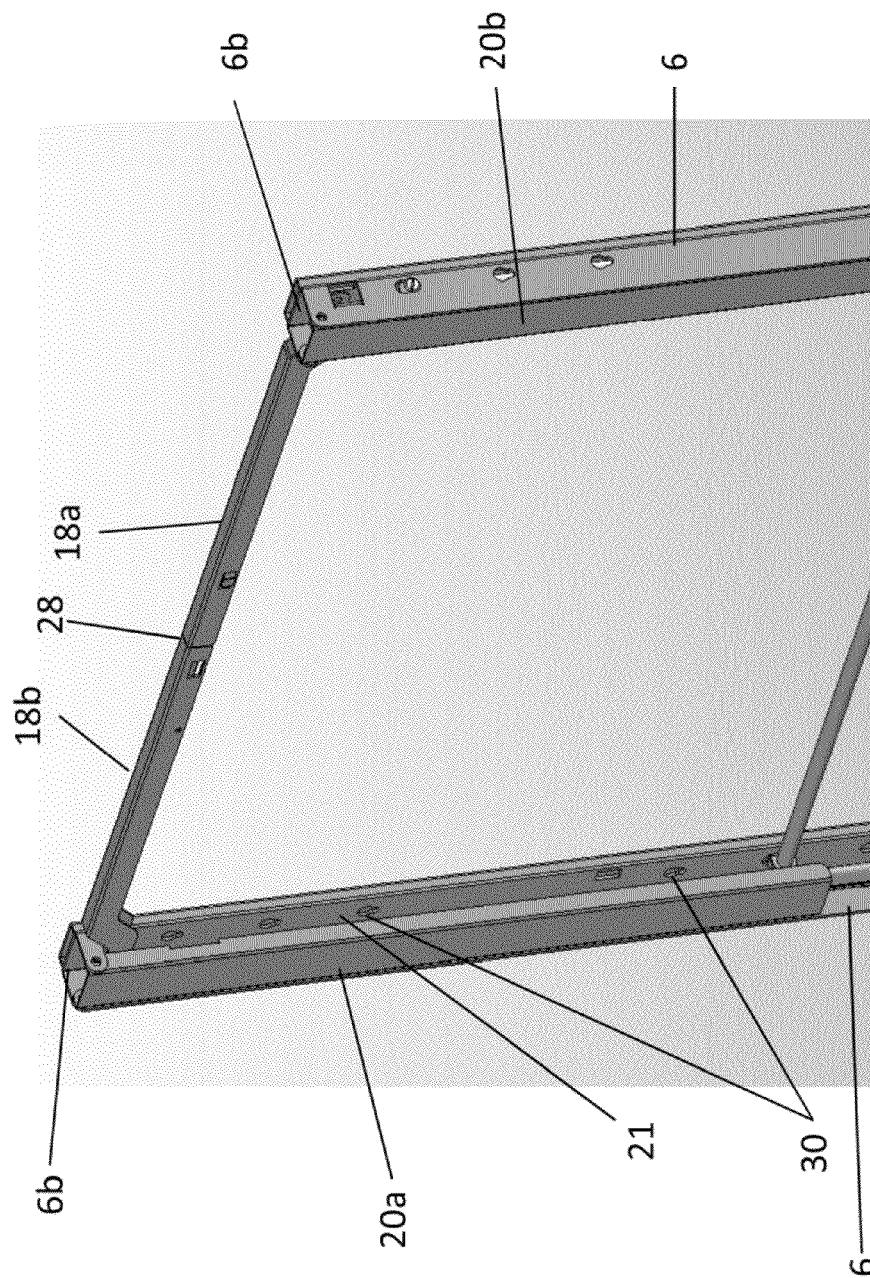
FIG. 7 is a detailed view of two connected posts, in accordance with the present invention.

With reference now to FIGS. 3, 4 and 7, once two or more adjacent posts 6, 9 are in a raised position, and locked into an upright position by means of the locking slider 11 and pin 13, two adjacent posts 6, 9 are connected by means of a crossbar 18 across the narrower dimension 19 of the platform 4, and two adjacent posts by means of crossbar 20 along the wider dimension 21 of the platform 4. In one embodiment, the crossbar is made up of two sections, one from each of the posts 6, 9 that are being connected, which are connected together by means of a joint 28. Each post has a first and second crossbar section (18a, 20a for instance), pivotally mounted thereto. First crossbar sections 18a, 18b for connecting the posts 6, 9 common to the narrower side 19 and the second crossbar sections 20a, 20b for connecting the posts 6, 9 common to the wider dimension 21. In FIG. 7, the first crossbar sections 18a, 18b are shown in a connected position, and the second crossbar sections 20a, 20b are in a folded position. Both crossbar sections 18, 20 are hinged near the top 6b, 9b of each respective post 6, 9, and are able to fold so as to be flush with the post 6, 9. In one embodiment, the crossbar sections are formed of U-shaped metal sections, so that the first crossbar sections 18a, 18b when folded fit within a groove 21 along the length of the post 6, 9, and the second crossbar sections 20a, 20b fit along and around the post as shown in FIG. 6 so that they lie flush with the side of the post 6, 9.

With reference to FIGS. 8a and 8b, the first crossbar sections 18a, 18b across the narrower dimension 19 between adjacent posts 6, 9 are releasably connected together, thereby adding rigidity for keeping the posts 6, 9 upright and in position relative to one another, using one another for support, as well as providing a railing between the posts 6, 9 so as to better keep an object on the platform 4. FIG. 8a shows the first crossbar sections 18a, 18b unconnected even though they meet at junction 28. To releasably connect sections 18a, 18b, a pinchable switch 22 is pinched and dragged from switch opening 23 to switch opening 24. The switch 22 is lightly sprung so it may be pinched easily by the fingers, and pushed within the crossbar section between openings 23, 24. The edges of the switch 22 are at right angles to the opening 23, 24 so the switch releasably locks into the opening 23, 24. The switch 22 is attached to a slidable brace 25 within sections 18a and 18b, so that when dragged between the sections 18a, 18b, it releasably connects the sections so that they may not be independently separated and lowered without the switch 22 being moved from opening 24 to opening 23. The brace is maintained in position while sliding across the junction 28 between the sections 18a, 18b by means of a guide rod 26 mounted across the interior of the section 18b, and a corresponding track 27 in the brace 25.

Figure 9B:
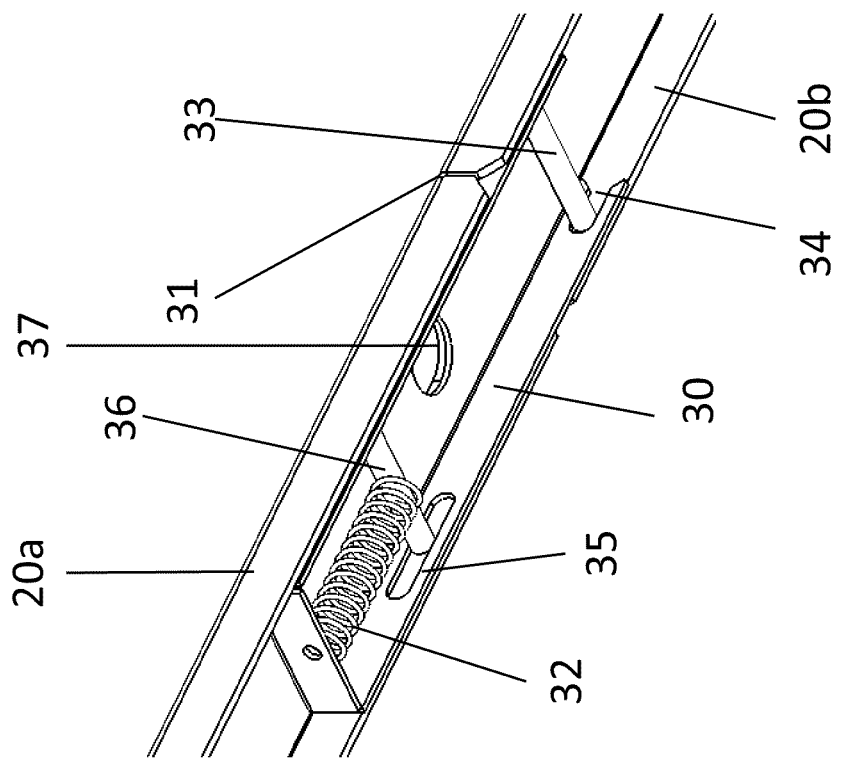
FIG. 9b is a detailed view of the wide crossbars in a connected and locked position, in accordance with the present invention.
Figure 9A:
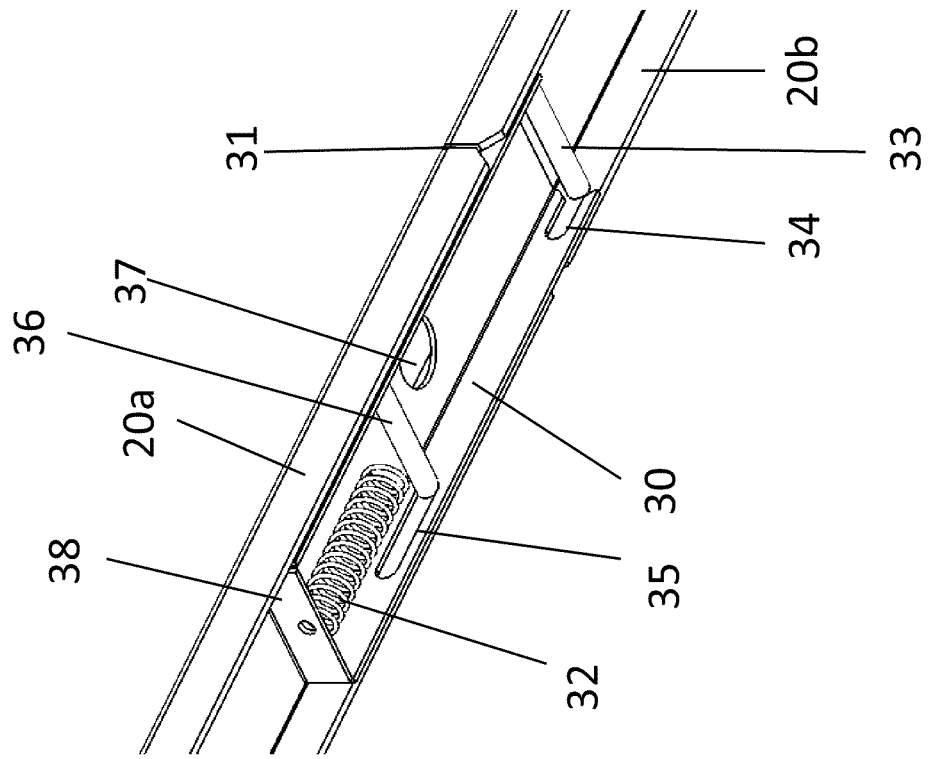
FIG. 9a is a detailed view of the wide crossbars in an unlocked position, in accordance with the present invention.

With reference to FIGS. 9a and 9b, the second crossbar sections 20a, 20b are similarly releasably connected together across the wider dimension 21, in order to add rigidity to the upright posts 6, 9 and to provide a restraint or railing to keep objects on the platform 4. In FIG. 9a the crossbars 20a, 20b are shown unconnected, and in FIG. 9b the crossbars are shown releasably connected. Section 20a has a spring-loaded mechanism also containing a brace 30, which in the unconnected position is biased by a spring 32 to protrude from the end of section 20a into the junction 31. The spring 32 is connected between the rear plate 38 of the brace 30 and the guide rod 36. The brace 30 has two grooves 34 at the end which interface with a rod 33 mounted across the interior of section 20b, which interface of spring-biased grooves 34 and rod 33 is capable of locking together and holding the sections 20a, 20b together. The brace 30 also has a guide slot 35 through which passes guide rod 36, which rod 36 is mounted between the interior walls of the crossbar 20a. The locking interface between the grooves 34 and rod 33 is releasable by a user pushing their finger through the finger hole 37 and pushing the brace 30 back against the biasing spring 32, thereby releasing the rod 33 from grooves 34, and permitting the crossbars 20a, 20b to be separated. In FIG. 9a the spring 32 is more compressed in comparison to the spring 32 in FIG. 9b.

Referring to FIGS. 3, 4, 10a and 10b, upper telescopic arms made up of upper external segment 39 and upper internal segment 40 having a knob 41 at its outer tip 42. The upper telescopic arms lie at rest within the posts 6, 9, and are pivotally connected to said posts 6, 9 by means of a hinge (not shown), for example, may be pivoted so as to protrude at right angles to the post 6, 9, facing an adjacent post 6, 9. The upper internal segment 40 may then be extended, telescopically, from within the upper external segment 39 to reach across to the adjacent post 6, 9. Once extended to the adjacent post 6, 9, the knob 41 attached to the right-angled outer tip 42 of the upper internal segment 40 is inserted into an inverted teardrop-shaped receptacle 43 having a lower, narrower portion 43a in the post 6, 9, by which the knob 41 may be releasably restrained within the post. The knob 41 is preferably made of rubber, or metal with a rubber sleeve, to form a firm connection with the lower, narrow portion 43a of receptacle 43. In a similar manner, the lower telescopic arms made up of lower external segment 44 and lower internal segment 45 having a knob 41 mounted to its outer tip 42. The lower telescopic arms lie at rest within the posts 6, 9, and are pivotally connected to said posts 6, 9 by means of a hinge (not shown), for example, may be pivoted so as to protrude at right angles to the post 6, 9, facing an adjacent post 6, 9. The lower internal segment 45 may then be extended, telescopically, from within the lower external segment 44 to reach across to the adjacent post 6, 9. Once extended to the adjacent post 6, 9, the knob 41 attached to the end of the lower internal segment 45 is inserted into an inverted teardrop-shaped receptacle 43 in the post 6, 9, by which the knob 41 may be releasably restrained within the post 6, 9. One skilled in the art would know that rubber or nylon ropes may be substituted for the telescopic arms without straying from the scope of the patent. The aforementioned knob 41 would be attached to the ends of the rope, so as to interface with the receptacle 43.

In one embodiment and with reference to FIG. 4, posts 6, 9 which are adjacent to one another, have, on the first post on the side facing the second post, only an upper telescopic arm or a lower telescopic arm, with the second posts has the opposite arm to the first, so that there is only one telescopic arm, either an upper of lower telescopic arm, on each side of the post 6, 9. For example, in FIG. 4, post A has a lower telescopic arm facing post B, and post B has an upper telescopic arm facing post A. Post B has a lower telescopic arm facing post C, and post C has an upper telescopic arm facing post B. Post C has a lower telescopic arm facing post D, and post D has an upper telescopic arm facing post C, and post D has a lower telescopic arm facing post A, and post A has an upper telescopic arm facing post D. Using the adjustment holes 43 provided, which are located along the length of the posts 6, 9, the location of the upper and lower telescopic arms may be varied according to necessity and use. The extension of the telescopic arms forms a barrier keeping objects on the dolly 2. The telescopic arms may be positioned by the user between the posts 6, 9 depending on the required use of the dolly.

Referring to FIGS. 3 and 4, FIG. 3 represents one alternative variation of the base model dolly 2, in that there is provided a "Push Cart" having the telescopic arms integrally maneuvered and secured in between second posts 9, while first posts 6 are in the closed position so as to produce a flat platform 4. In FIG. 4 all four posts are raised, producing a virtual "box" within which bulky items such as bags or luggage, or when used for moving, bags of items for instance may be moved, as well as items such as chairs, tables and boxes with no tops, all items that are difficult to move with traditional dollies.

Figure 11:
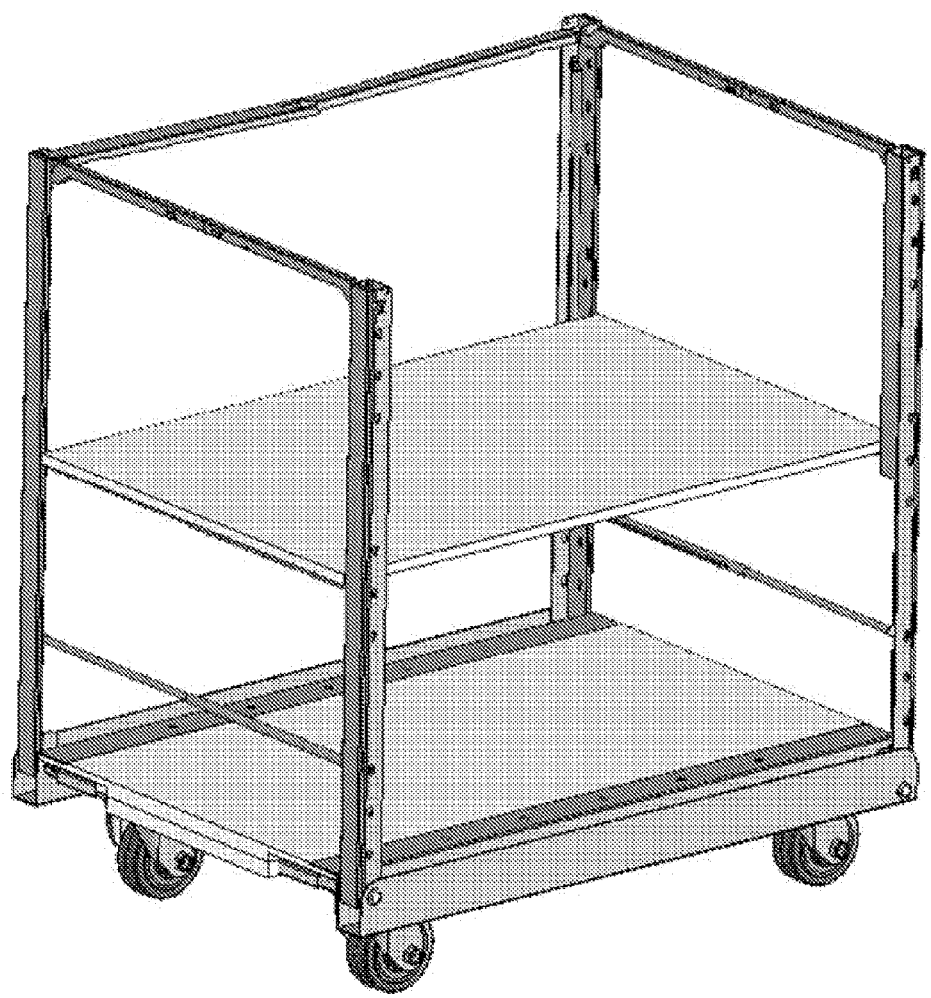
FIG. 11 is a perspective view of the dolly with shelves, in accordance with the present invention.
Figure 12:
FIG. 12 is a perspective view of the dolly with three raised sides and one side open, in accordance with the present invention.
Figure 13:
FIG. 13 is a perspective view of the dolly with a different side open, in accordance with the present invention.
Figure 14:
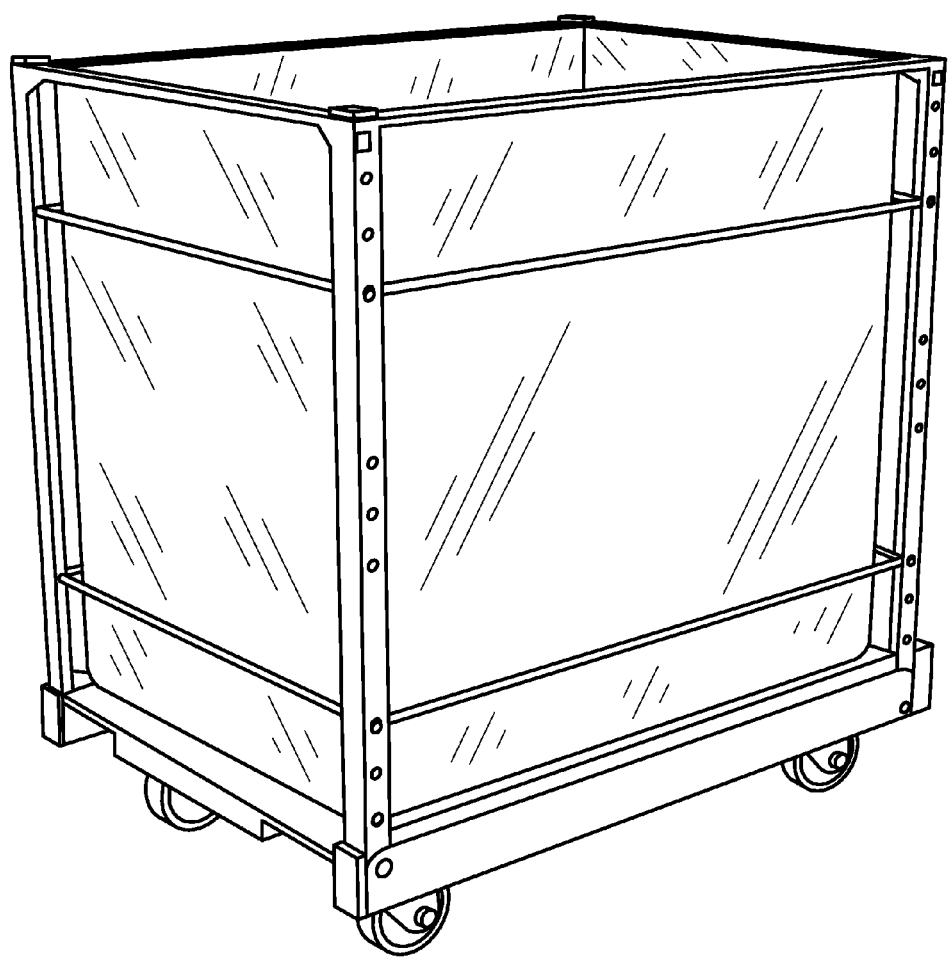
FIG. 14 is a perspective view of the dolly with a bag within the four sides, in accordance with the present invention.
Figure 15:
FIG. 15 is a perspective view of the dolly with opposite sides raised, in accordance with the present invention.

FIGS. 11, 12, 13, 14 and 15 represent variations of the base model dolly 2 applied for different situations and subsequent needs. For example, FIG. 11 shows a rolling shelf cart, FIG. 12 shows a three-sided cart for holding bulky objects while maintaining easy access to objects. FIG. 13 shows an alternative configuration of the three-sided cart where the narrow side is the open one. FIG. 14 shows a rolling basket cart, and FIG. 15 shows a configuration with two sides only, which is useful for carrying long items such as lumber or drywall.

In another embodiment, the dolly 2 is adjustable about a separation line revealing a secondary or second platform (not shown) for increasing the dimension and surface area of the dolly 2 an enabling the dolly 2 to accommodate more materials or objects. The second platform (not shown) joins to the first platform 4 by a secure joint (not shown) so that it effectively becomes a rigid extension of the first platform 4.

In one embodiment, the platform 4 and posts 6, 9 are made of high-density plastic, however for applications requiring a more durable embodiment one or both of the platform 4 and posts 6, 9 may be made of metal. The post storage 5 has a squared-off U-shaped cross-section and is made of metal in one embodiment, and molded from plastic within the platform 4 in another. One skilled in the art would appreciate that other materials may be used for construction of the adjustable dolly without deviating from the scope of the invention.

Although the invention has been described above by reference to certain embodiments of the invention, the invention is not limited to the embodiments described above. Modifications and variations of the embodiments described above will occur to those skilled in the art in light of the above teachings. Moreover, with respect to the above description, it is to be repulsed that the optimum dimensional relationships for the component members of the present invention may include variations in size, material, shape, form, funding and manner of operation.

We claim:

1. An adjustable transport dolly for storing objects between at least two locations, said adjustable dolly comprising:
    a. a rectangular platform having four sides, the platform having a narrow dimension and a wide dimension, and having at least one caster mounted to its underside;
    b. a post storage mounted on each side having a wide dimension;
    c. two first posts and two second posts each pivotally mounted to said post storage at a corner of said platform, each post being moveable between open and closed positions, each post having two crossbars pivotally mounted thereto, the crossbars for connecting with the adjacent post across the narrow dimension and the adjacent post across the wide dimension;
    d. said first and second posts having a locking mechanism that control pivoting of said posts, the locking mechanism comprising:
        i. a slider hinge mounted to the underside of said platform;
        ii. a locking slider pivotally mounted to said hinge, wherein the locking slider is in contact with said post storage;
        iii. a locking pin connected to said locking slider wherein the locking pin is locked and released by movement of the locking slider,
    wherein the locking slider exerts force against said post storage when moved into a locked position by caroming against the post storage.

2. The dolly of claim 1, wherein in a closed position the second post lies in a horizontal orientation below the first post within the post storage.

3. The dolly of claim 1, each post further comprising telescopic arms for connection to adjacent posts, the telescopic arms comprising:
    a. an external segment pivotally connected to the first post;
    b. an internal segment slidably extendable from said external segment, the internal segment having an outer tip at its extremity and a knob mounted to said outer tip;
    c. the second post having an inverted teardrop-shaped receptacle for releasably restraining said knob.

4. The dolly of claim 3 wherein each post has two telescopic arms for connection to adjacent posts.

5. The dolly of claim 1, wherein the crossbars are formed of crossbar sections having a length of approximately half of the distance between adjacent posts.

6. The dolly of claim 5, wherein a first crossbar is releasably connected with a second crossbar of an adjacent post by a connecting means comprising:
    a. a brace slidably mounted within a crossbar section;
    b. a switch operably connected to said brace
    wherein said crossbars sections each have an opening, and said switch may be moved from said opening of the first crossbar section to said opening of the second crossbar section, so as to slide the brace between said crossbar sections.

7. The dolly of claim 5, wherein a first crossbar section is releasably connected with a second crossbar section of an adjacent post by a connecting means comprising:
    a. a brace slidably mounted within a first crossbar section, the brace having grooves at a tip protruding from an end of the crossbar section;
    b. a spring operatively connected between said brace and said first crossbar section, to bias the tip towards the end of said crossbar section;
    c. the second crossbar section having a locking rod mounted therein for interfacing with said grooves
    wherein said grooves are releasable by sliding said brace away from the end of the crossbar section.

8. An adjustable transport dolly for storing objects between at least two locations, said adjustable dolly comprising:
    a. a rectangular platform having first and second pairs of sides of equal dimension, and having at least one caster mounted to its underside;
    b. a post storage mounted on each of one pair of sides;

c. two first posts and two second posts each pivotally mounted to said post storage at a corner of said platform, each post being moveable between open and closed positions, each post having two crossbars pivotally mounted thereto, the crossbars for connecting with the adjacent post across one of said first pair of sides and the adjacent post across one of said second pair of sides;

d. said first and second posts having a locking mechanism that control pivoting of said posts, the locking mechanism comprising:
  i. a slider hinge mounted to the underside of said platform;
  ii. a locking slider pivotally mounted to said hinge, wherein the locking slider is in contact with said post storage;
  iii. a locking pin connected to said locking slider wherein the locking pin is locked and released by movement of the locking slider, wherein the locking slider exerts force against said post storage when moved into a locked position by camming against the post storage.

* * * * *